US006324630B1

(12) United States Patent
Onodera

(10) Patent No.: US 6,324,630 B1
(45) Date of Patent: *Nov. 27, 2001

(54) METHOD OF PROCESSING A DATA MOVE INSTRUCTION FOR MOVING DATA BETWEEN MAIN STORAGE AND EXTENDED STORAGE AND DATA MOVE INSTRUCTION PROCESSING APPARATUS

(75) Inventor: Osamu Onodera, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/454,592

(22) Filed: Dec. 7, 1999

Related U.S. Application Data

(63) Continuation of application No. 08/813,633, filed on Mar. 7, 1997, now Pat. No. 6,128,714, which is a continuation of application No. 08/402,371, filed on Mar. 13, 1995, now Pat. No. 5,684,974.

(30) Foreign Application Priority Data

Mar. 17, 1994 (JP) .................................................... 6-072536
Mar. 7, 1996 (JP) .................................................... 8-049955

(51) Int. Cl.⁷ ..................................................... G06F 12/00
(52) U.S. Cl. .................................. 711/165; 711/1; 711/2; 711/5; 711/200; 711/201; 711/202; 711/203; 711/204; 711/205
(58) Field of Search ................................... 711/141, 101, 711/2, 202–205, 206, 207, 1, 5, 165; 709/200, 212–214

(56) References Cited

U.S. PATENT DOCUMENTS

| 3,723,976 | 3/1973 | Alvarez et al. ............... 340/172.5 |
|---|---|---|
| 4,075,694 | 2/1978 | Ericsson .......................... 395/412 |
| 4,577,274 | 3/1986 | Ho et al. ......................... 711/205 |
| 4,685,057 | 8/1987 | Lemone et al. ................ 395/421.1 |
| 4,761,737 | 8/1988 | Duvall et al. ................... 395/419 |
| 5,179,662 | * 1/1993 | Herzl et al. ........................ 711/2 |
| 5,257,361 | 10/1993 | Doi et al. ....................... 711/207 |
| 5,269,009 | * 12/1993 | Herzl et al. ..................... 711/141 |
| 5,283,886 | 2/1994 | Nishii ............................. 711/144 |
| 5,371,867 | 12/1994 | George et al. ..................... 711/6 |
| 5,446,844 | 8/1995 | Stechler et al. ................. 711/118 |
| 5,463,739 | 10/1995 | Alvarez .......................... 711/207 |
| 5,526,509 | 6/1996 | Doi et al. ....................... 711/122 |
| 5,581,789 | * 12/1996 | Ueno et al. ...................... 710/20 |
| 5,684,974 | * 11/1997 | Onodera ......................... 711/202 |
| 6,128,714 | * 10/2000 | Onodera ......................... 711/165 |

FOREIGN PATENT DOCUMENTS 3101275  2/1989  (EP) .
2256513  12/1992 (GB) .

* cited by examiner

Primary Examiner—Than Nguyen
(74) Attorney, Agent, or Firm—Antonelli, Terry, Stout & Kraus, LLP

(57) ABSTRACT

A storage unit comprises a plurality of storage modules, each of which is dynamically assigned to and used as each area in a main storage (MS) or an extended storage (ES). The storage unit or a system controller has address arrays for MS and for ES which store information indicating which of the storage modules comprised in the storage unit each area in the MS and the ES corresponds to. When the contents of the MS/ES address arrays are rewritten to change a storage module belonging to the ES to a storage module belonging to the MS, a page-in operation is realized without executing an actual data move operation. Similarly, a page-out operation is realized without executing an actual data move operation by changing a storage module belonging to the MS to a storage module belonging to the ES.

2 Claims, 11 Drawing Sheets

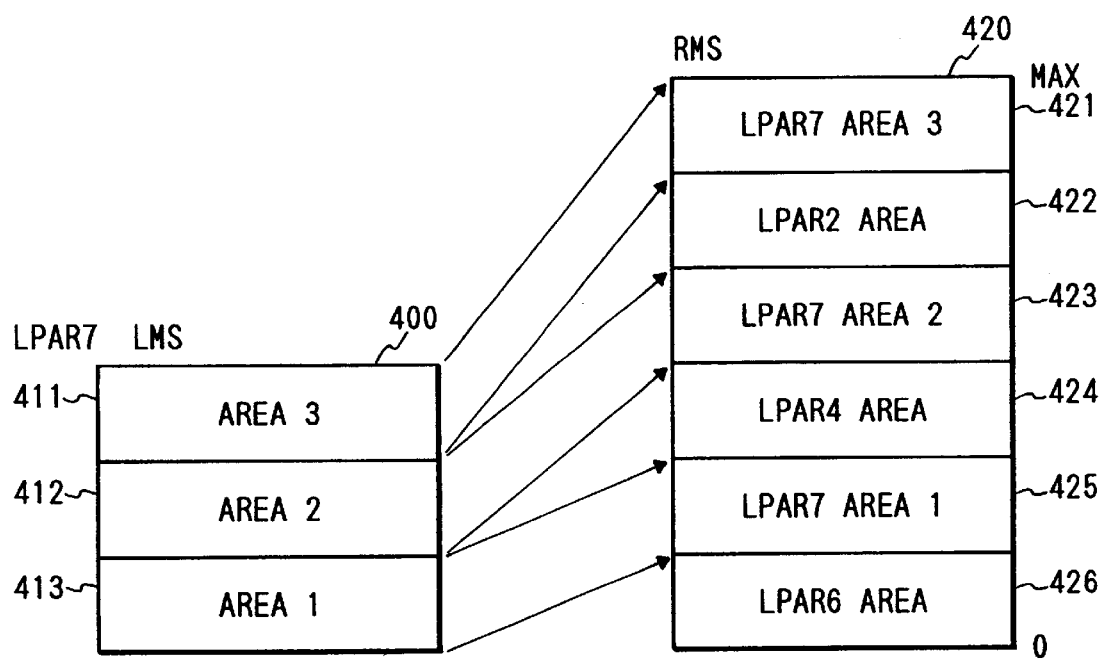

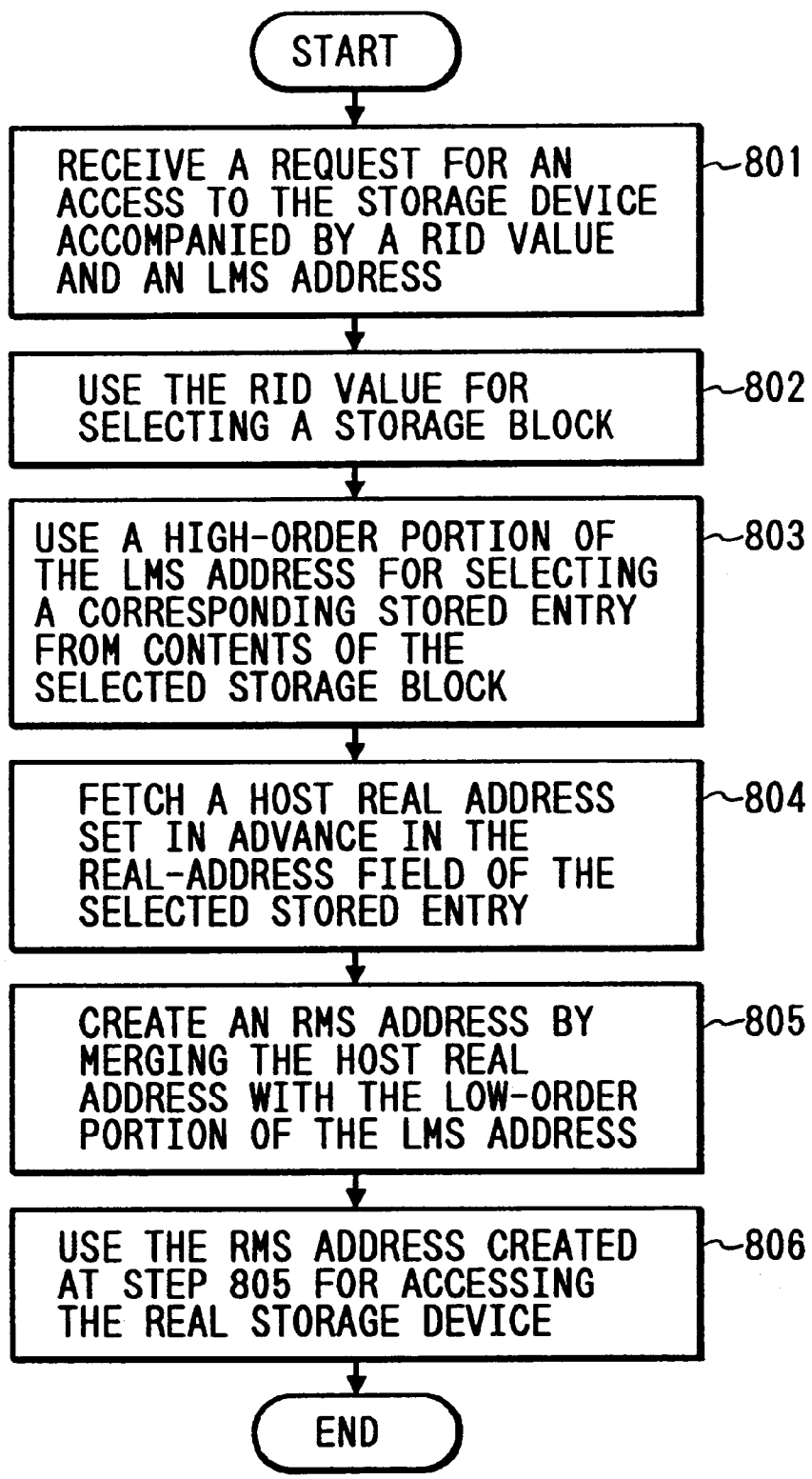

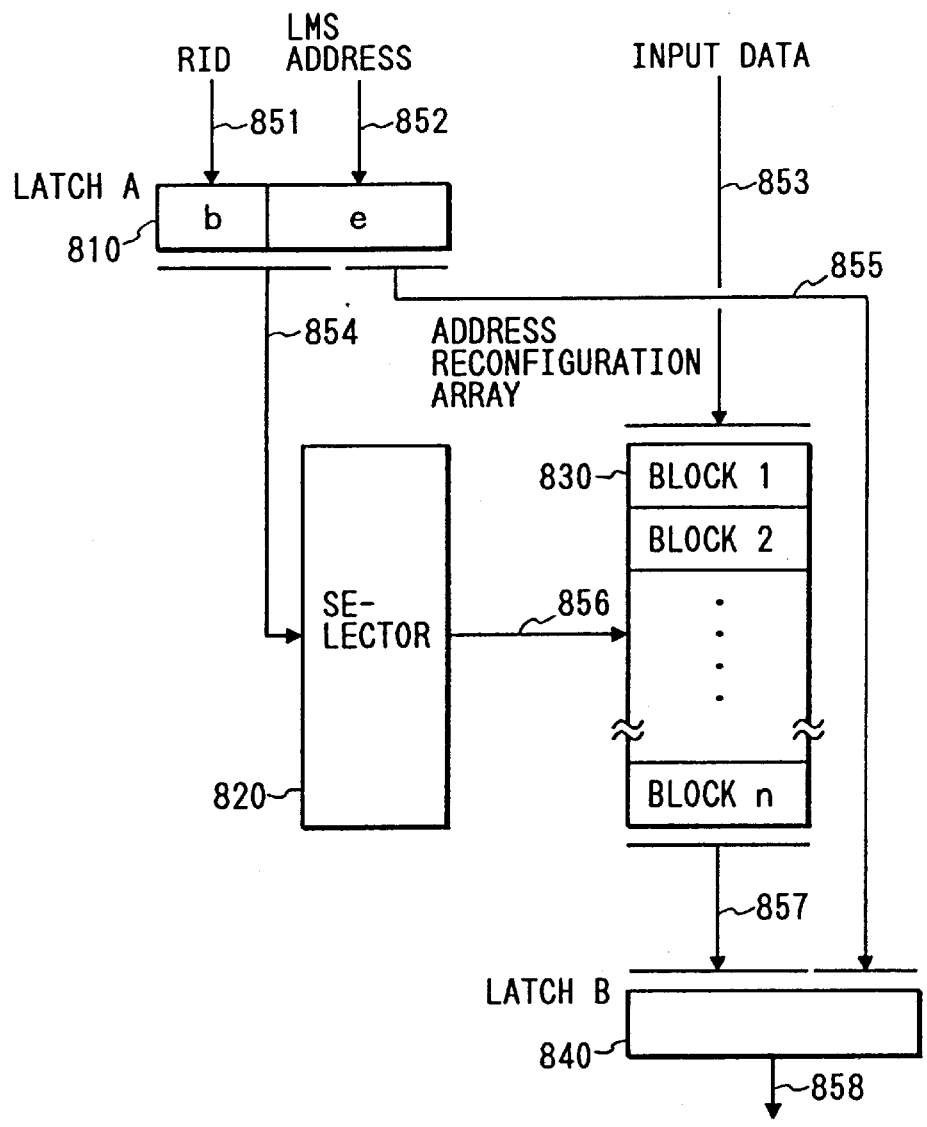

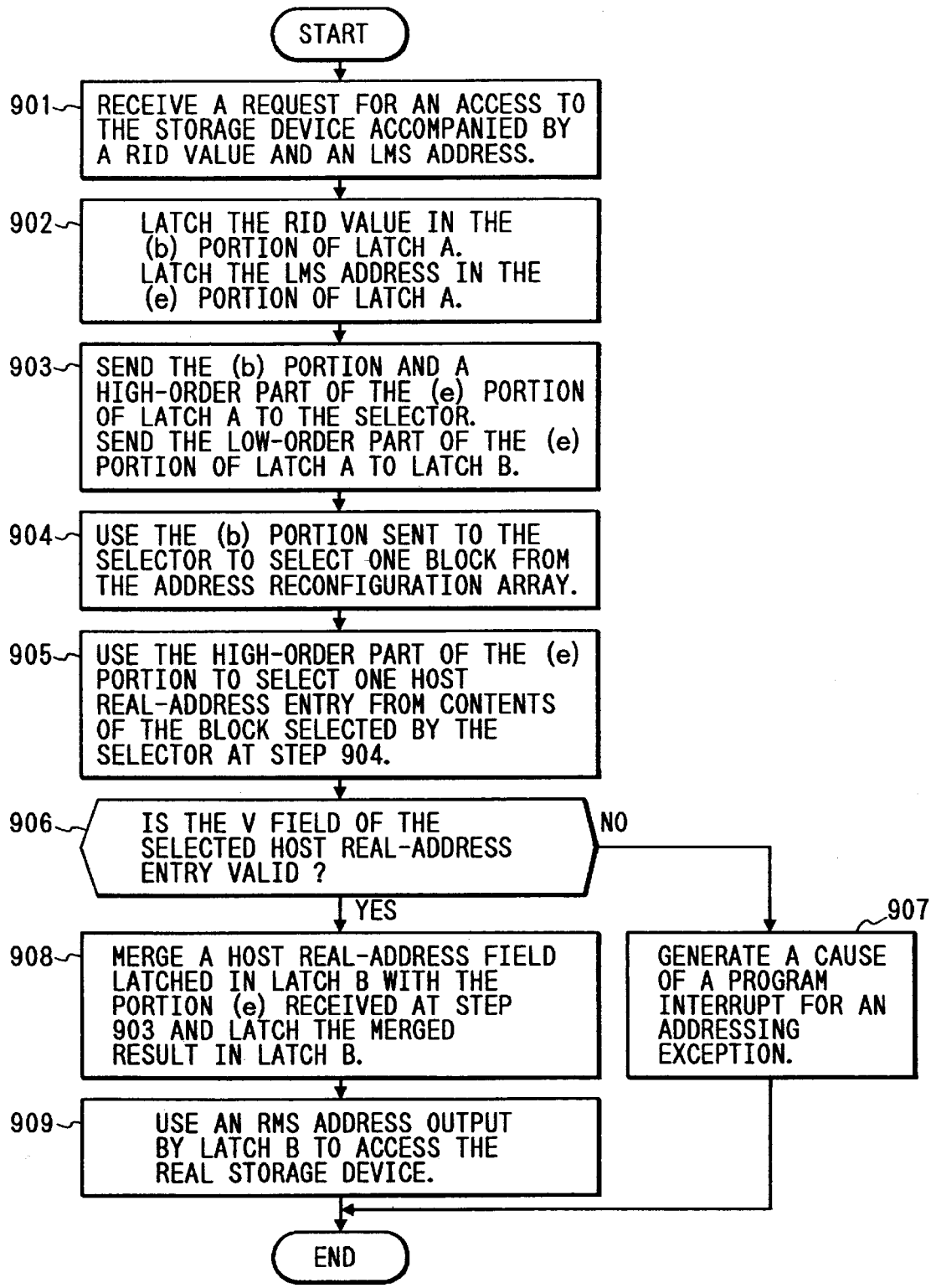

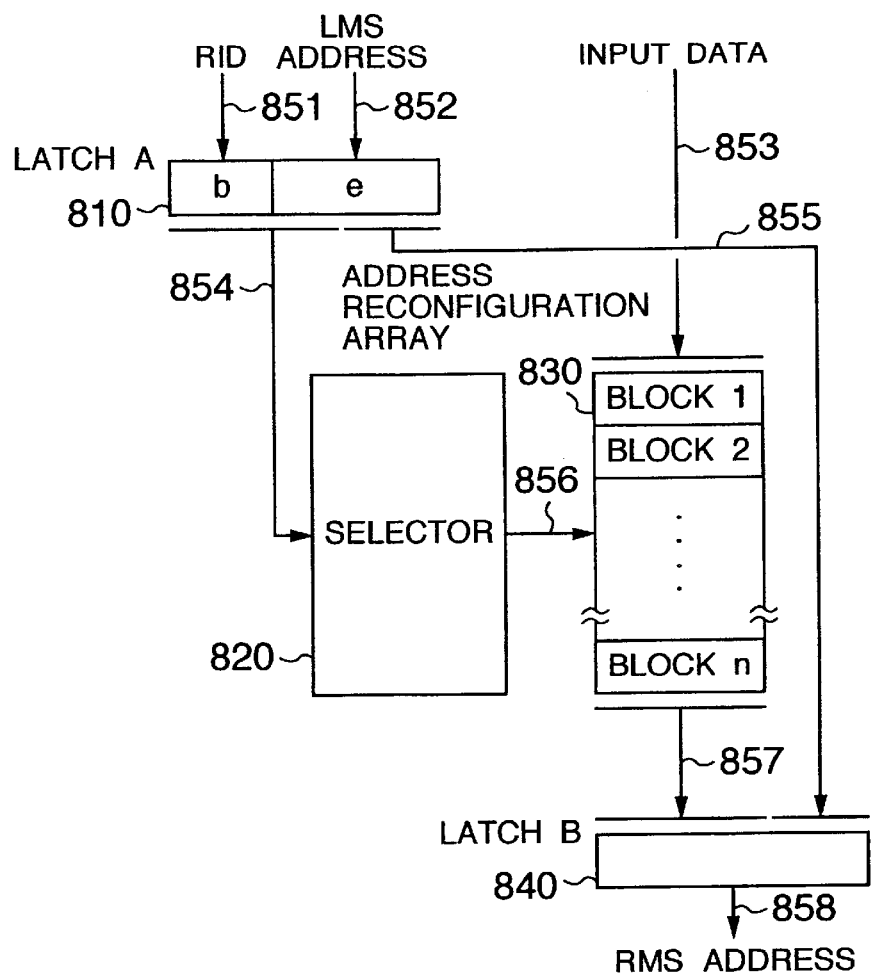

METHOD OF PROCESSING A DATA MOVE INSTRUCTION FOR MOVING DATA BETWEEN MAIN STORAGE AND EXTENDED STORAGE AND DATA MOVE INSTRUCTION PROCESSING APPARATUS

CROSS REFERENCE TO RELATED APPLICATIONS

This is a continuation of application Ser. No. 08/813,633, filed Mar. 7, 1997, now U.S. Pat. No. 6,128,714; which is a continuation of application Ser. No. 08/402,371, filed Mar. 13, 1995, now U.S. Pat. No. 5,684,974.

The present invention which is a continuation-in-part of U.S. patent application Ser. No. 08/402,371 entitled "METHOD AND APPARATUS FOR CONTROLLING RECONFIGURATION OF STORAGE DEVICE MEMORY AREAS" filed by O. Onodera, on Mar. 13, 1995 now U.S. Pat. No. 5,684,974 with claiming foreign priority benefits under Title 35, United States Code, 119 of a Japanese Patent Application No. 6-072536 filed on Mar. 17, 1994, the contents of the disclosure of which are incorporated herein by reference.

BACKGROUND OF THE INVENTION

The present invention relates generally to an information processing apparatus comprising a main storage and an extended storage, and more particularly to an information processing apparatus which is suitable for drastically improving a data move capability between a main storage and an extended storage.

A general purpose information processing apparatus is typically composed of a central processing unit (hereinafter abbreviated as "CPU"), a main storage (hereinafter abbreviated as "MS"), an input/output processing unit (hereinafter abbreviated as "IOP"), input/output devices connected to the IOP, and so on.

An input/output data processing procedure in the information processing apparatus composed of the units mentioned above is generally executed in the following manner. First, the IOP transfers input data from input/output devices connected to the IOP to the MS for temporarily storing the input data in the MS, and the data stored in the MS is processed by the CPU and again stored in the MS after the processing is completed. The processed data stored in the MS is then outputted to input/output devices through the IOP as output data.

The sequence of operations in the foregoing input/output data processing procedure is generally executed under the control of an operating system (hereinafter abbreviated as "OS") resident on the information processing apparatus. In addition, an approach for providing the OS with a virtual storage function is generally employed for apparently eliminating a limit to the capacity of the MS.

When the virtual storage function is included in an OS, a virtual storage device uses a storage capacity significantly larger than a real storage capacity of a MS. Thus, a portion of input/output devices connected to an IOP is generally used as an external storage device serving as a storage medium for the virtual storage device, such that data overflowing the actual storage capacity of the MS is temporarily stored in the external storage device. In this event, a data move operation, i.e., so-called page-in/page-out operations are executed by the MS and the external storage device under the control of the OS. Since the page-in/page-out operations are extremely frequently executed, the data move capability between the MS and the external storage device is a critical factor for determining the information processing performance of the information processing apparatus.

In recent years, it is a general tendency to employ an additional storage device called an "extended storage" (hereinafter abbreviated as "ES") which plays a different role from the MS and the external storage device for improving the data move capability in the page-in/page-out operations. The ES is a storage device dedicated to store, under the control of the OS, a portion or all of page data sets (data blocks) conventionally adapted to temporarily store data overflowing a real storage capacity of a MS using an external storage device connected to the IOP. The data move capability between the MS and the ES associated with page-in/page-out operations is quite higher as compared with the data move capability between the MS and an external storage device, since the former can move data without the intervention of an input/output interface. An increased data move capability between the MS and the ES associated with the page-in/page-out operations results in remarkable improvements in the information processing performance of the information processing apparatus.

U.S. Pat. Nos. 3,723,976; 4,761,737; 4,075,694; 4,685,057; and 5,371,867 disclose general services and functions of ES's in information processing apparatuses.

It should be noted that a page-in operation involving actual data transfer from an ES to a MS and a page-out operation involving actual data transfer from a MS to an ES are extremely frequently executed during the progress of data processing, so that the data transfer capability between the ES and the MS largely affects the data processing performance of the information processing apparatus.

SUMMARY OF THE INVENTION

It is an object of the present invention to provide an information processing apparatus comprising a MS and an ES as mentioned above which is intended to drastically improve an apparent data move capability between the MS and the ES to achieve remarkable improvements in the performance of a data processing procedure employing a virtual storage function of the information processing apparatus, in view of the technical background in which the performance of the data processing procedure employing the virtual storage function is determined depending on the data move capability between the MS and ES associated with page-in and page-out operations, and the data move capability between the MS and the ES is a critical factor for determining an upper limit to the information processing performance of the information processing apparatus.

According to the present invention, in an information processing apparatus having a storage unit including a plurality of storage modules, being assignable to a main storage or to an extended storage, a first address array connected to the respective storage modules and having address entries for a plurality of modules assigned to the main storage within the plurality of storage modules, a second address array connected to the respective storage modules and having address entries for a plurality of modules assigned to the extended storage within the plurality of storage modules, and a system controller connected to the first and second address arrays, respectively, a method of processing a data move instruction for moving data between the main storage and the extended storage, comprising the steps of:

inputting address entries for a plurality of modules assigned to the main storage within the plurality of storage modules to the first address array;

inputting address entries for a plurality of modules assigned to the extended storage within the plurality of storage modules to the second address array;

in response to a data move instruction for moving data between the main storage and the extended storage, moving an address entry indicative of the storage module specified by the move instruction between the first and second address arrays; and changing a flag in the address entry from one of values specifying the main storage and the extended storage to the other.

First and second latches connected to the first and second address arrays, respectively, for latching outputs thereof are both connected to each of the plurality of storage modules.

The system controller, responsive to a data move instruction, before moving an address entry indicative of the storage module between the first and second address arrays, can set a flag in another address entry to a value other than values specifying the main storage and the extended storage and issue an instruction to the storage module specified by the other address entry to move data in the storage module.

A system according to the present invention comprises:

a storage device including a plurality of storage modules, each of which is assigned to and used as each area (data block) of a main storage (MS) or an extended storage (ES) during operation of the system;

a MS address array having a plurality of storage entries corresponding to respective areas in the MS, each for storing an identifier indicative of a storage module assigned to an associated area in the MS; and an ES address array having a plurality of storage entries corresponding to respective areas in the ES, each for storing an identifier indicative of a storage module assigned to an associated area in the ES.

When an access request for accessing the MS or the ES is issued from an IOP or an IP, a storage module identifier is retrieved from a storage entry corresponding to an access requested area in the MS address array or the ES address array to select a storage module indicated by the identifier for executing the access operation. In other words, the IOP and the IP do not at all take into account the storage device, and can request a memory access operation on the assumption that the MS and the ES apparently exist independently of each other. In this event, if a plurality of storage module identifiers are defined in a storage entry in the MS/ES address arrays, different storage modules can be simultaneously accessed with the same data.

When a data move request for moving data from the MS to the ES is issued, a storage module identifier in a storage entry corresponding to a data source area in the MS address array is read and written into a storage entry corresponding to a data destination area in the ES address array. Conversely, when a data move request for moving data from the ES to the MS is issued, a storage module identifier in a storage entry corresponding to a data source area in the ES address array is read and written into a storage entry corresponding to a data destination area in the MS address array. As a result, data transfer and storage (page-out/page-in) instructions for moving data from the MS to the ES and vice versa can be executed without actual data transfer and storing operations. In addition, prior to the data transfer and storing operations, if a storage module identifier is newly registered in the storage entry corresponding to the data source area in the MS or ES address array, so that data in the storage module corresponding to the storage module identifier originally stored in the storage entry is previously transferred to a storage module corresponding to the newly registered storage module identifier, source data can be preserved in the MS or the ES. The number of bytes in one module indicates the number of bytes to be collectively transferred from or to the ES. A storage module identifier is given to each storage module in each storage entry.

BRIEF DESCRIPTION OF THE DRAWINGS

FIG. 4 is a diagram for explaining a correspondence between a plurality of data blocks in an ES, a MS, and an external storage device;

FIG. 5 is a time chart representing page-in/page-out operations advanced by an information processing apparatus using synchronous MS-ES data move instructions;

FIG. 6 is a time chart representing page-in/page-out operations advanced by an information processing apparatus using asynchronous MS-ES data move instructions;

FIG. 7 is a block diagram illustrating in detail an embodiment of hardware including storage modules constituting a MS and an ES in the information processing apparatus of the present invention, an MS/ES address array, and so on;

FIG. 8 is a block diagram illustrating a portion of the hardware configuration according to another embodiment of the present invention;

FIGS. 9A, 9B each illustrate in detail an example of a field structure in one entry of the MS/ES address array shown in FIG. 7;

DESCRIPTION OF THE PREFERRED EMBODIMENTS

Figure 1:
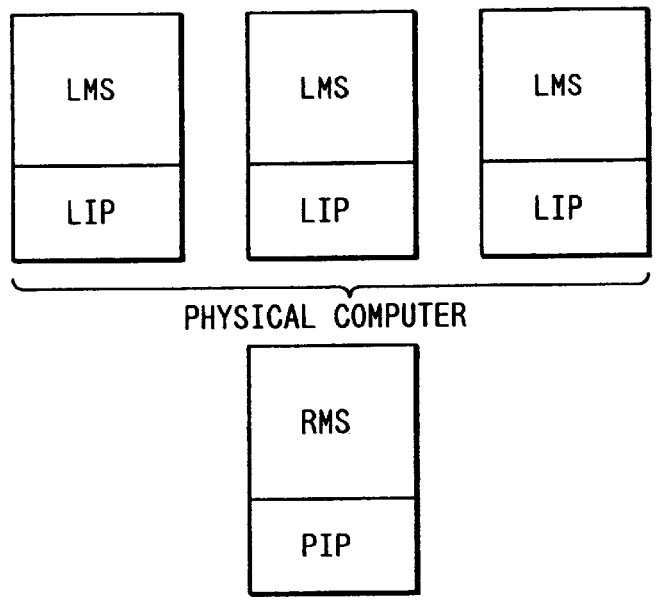
FIG. 1 is a block diagram conceptually illustrating the configuration of an embodiment of an information processing apparatus according to the present invention.

FIG. 1 illustrates an embodiment of an information processing apparatus equipped with an extended storage (ES). The information processing apparatus comprises a CPU 130, a main storage (MS) 110, an extended storage (ES) 120, an I/O processor (IOP) 140, and at least one input/output device 150 connected to the IOP 140. Here, the CPU 130 further includes at least one instruction processors (hereinafter abbreviated as "IP") 135, 136 and a system controller (hereinafter abbreviated as "SC") 131. The CPU 130 retrieves instructions and data stored in the MS 110 to process the data, perform the initiation of an input/output operation and so on through the IOP 140, and control the entire information processing apparatus in accordance with the procedure of the retrieved instructions. The MS 110, which serves as a main storage for storing instructions and data before and after processing, communicates data with the CPU 130 and the IOP 140. The IOP 140 manages data transfer between the input/output devices 150 and the MS 110 and control of the data transfer based on an instruction issued by the CPU 130 to initiate an input/output operation. The ES 120, which serves as an extended storage for temporarily storing data originally stored in the main storage, communicates data with the MS 110 under the control of the CPU 130. The SC 131 manages data transfer between the IOP 150 and the MS 110 and control of the data transfer as well as data transfer between the IP's 135, 136 and the MS 110 and control of the data transfer. Generally, the IP 135 and IP 136 retrieve instructions and data stored in the MS 110 through the SC 131 in order to process the data as well as perform the initiation of input/output operations through the SC 131 and so on in accordance with the procedure of the retrieved instructions.

Figure 2:
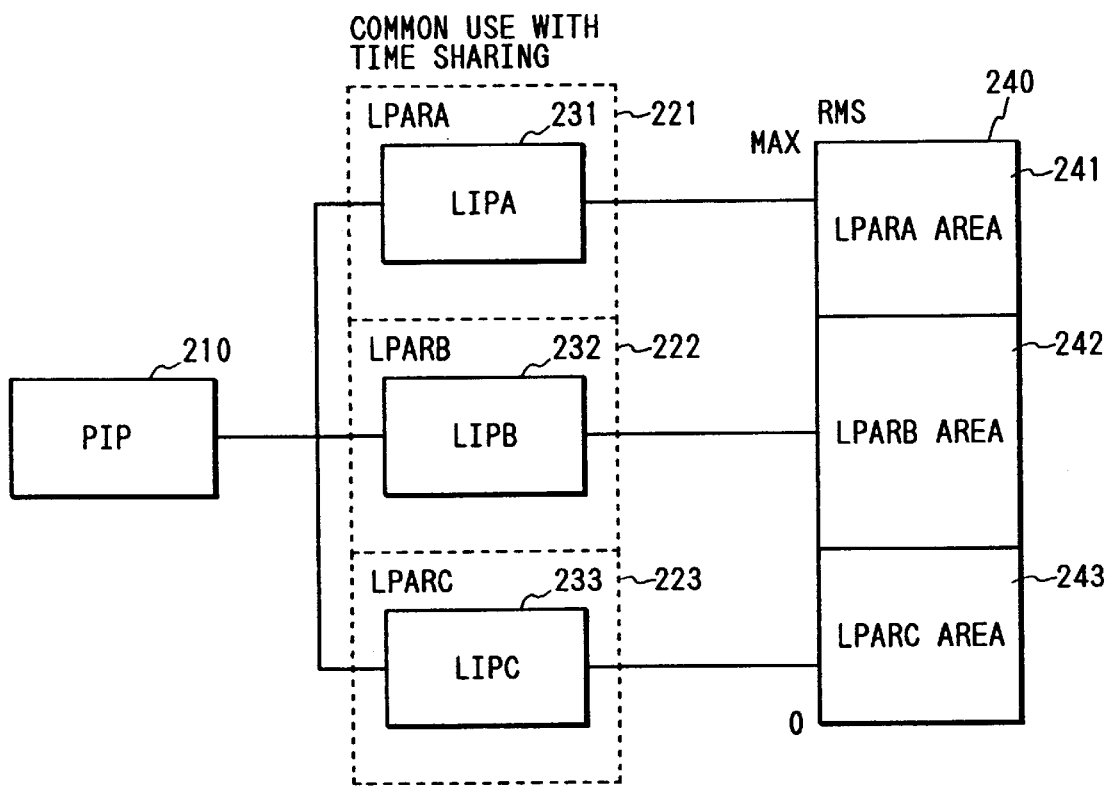
FIG. 2 is a diagram for explaining a data transfer path from input/output devices to an ES.

Next, a data transfer procedure for transferring data from the input/output devices 150 to the ES 120 will be explained with reference to FIGS. 1 and 2. FIG. 2 illustrates a data transfer path from the input/output devices 150 to the ES 120.

When the IP 135 or 136 issues an input/output instruction, an input/output initiation order associated with the input/output instruction is sent to the IOP 140 through the SC 131. The IOP 140 responsively selects a specified input/output device from the input/output devices 150 to initiate an input/output operation, and thereafter controls a data transfer operation for input data sent from the selected input/output device.

The input data sent from the selected input/output device within the input/output devices 150 is once buffered in the IOP 140, and then stored in the MS 110 through the SC 131. In this event, the SC 131 controls a data transfer operation between the IOP 140 and the MS 110.

When a sequence of data transfer operations for inputting the input data from the IOP 140 to the MS 110 through the SC 131 is terminated, the IOP 140 sends an interrupt indicative of the termination of the sequence of data transfer operations to the associated IP 135 or 136 through the SC 131. The IP 135 or 136, responsive to the interrupt, processes predetermined data which has been stored in the MS 110 by the sequence of data transfer operations.

In this event, the IP 135 or 136 issues a MS-ES data move instruction when data stored in the MS 110 is temporarily stored in the ES 120. As the IP 135 or 136 issues the MS-ES data move instruction, a MSES data move initiation order associated with the MS-ES data move instruction is sent to the SC 131. The SC 131, which has received the order, initiates a data move operation for moving data from the MS 110 to the ES 120, i.e., an operation for copying the data stored in the MS 110 to the ES 120, and subsequently controls the data transfer operation.

The termination of the ME-ES data move operation is recognized by the IP which has issued the instruction, as the termination of the instruction if the issued MS-ES data move instruction is a synchronous instruction. On the other hand, if the issued MS-ES data move instruction is an asynchronous instruction, the SC 131 sends an interrupt indicative of the termination of the sequence of data transfer operations to the IP 135 or 136, whereby the IP which has issued the instruction recognizes the termination.

Figure 3A:
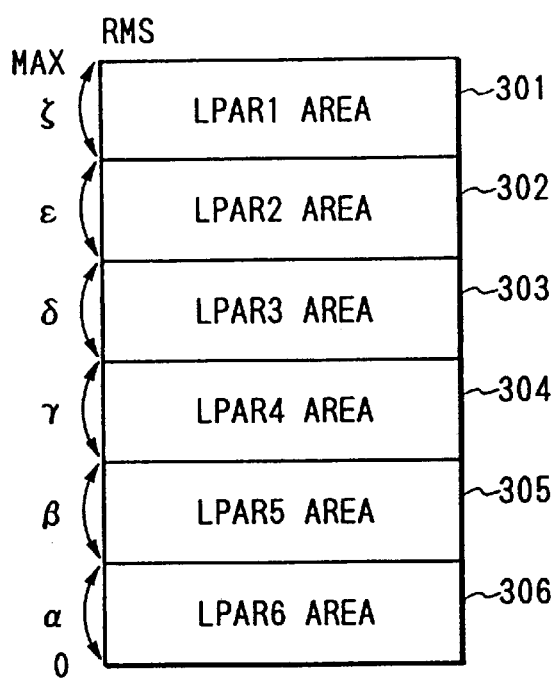
FIG. 3 is a diagram for explaining a data transfer path from the ES to input/output devices.
Figure 3B:
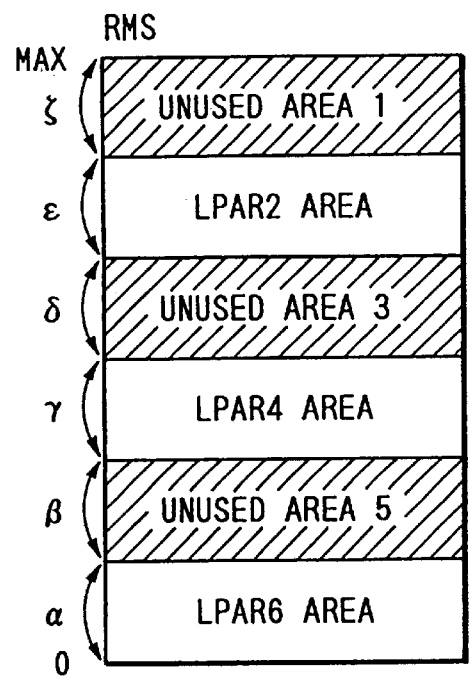

Next, a data transfer procedure for transferring data from the ES 120 to the input/output devices 150 will be explained with reference to FIGS. 1 and 3. FIG. 3 is a diagram illustrating a data transfer path from the ES 120 to the input/output devices 150.

When data is to be transferred from the ES to a specified external storage device or output device within the input/output devices 150, the IP 135 or 136 issues a MS-ES data move instruction for-moving data stored in the ES 120 to the MS 110. When the IP 135 or 136 issues the MS-ES data move instruction, a MSES data move initiation order associated with the MS-ES data move instruction is sent to the SC 131 which, upon receiving the order, initiates a data transfer operation from the ES 120 to the MS 110, and subsequently controls the data transfer operation.

The termination of the data move operation from the ES 120 to the MS 110 is recognized in a similar manner to the data transfer operation from the MS 110 to the ES 120. Specifically, the termination is recognized by the IP which has issued the instruction, as the termination of the instruction if the issued MS-ES data move instruction is a synchronous instruction. On the other hand, when the issued MS-ES data move instruction is an asynchronous instruction, the SC 131 sends an interrupt indicative of the termination of the sequence of data transfer operations to the IP 135 or 136, whereby the P which has issued the instruction recognizes the termination.

When the data transfer from the ES 120 to the MS 110 is terminated, the IP 135 or 136 issues an input/output instruction for transferring data from the MS 110 to a specified external storage device or output device within the input/output devices 150. Then, an input/output initiation order associated with the input/output instruction is sent to the IOP 140 through the SC 131, and the IOP 140, which has received the order, selects the specified external storage device or output device within the input/output devices 150 to initiate an output operation, and thereafter controls a data transfer operation for output data sent from the MS 110. The SC 131 also controls a data transfer operation between the MS 110 and the IOP 140.

The output data sent from the MS 110 is transferred to the IOP 140 through the SC 131. The output data is once buffered in the IOP 140, and then sent to the selected external storage device or output device within the input/output devices 150. When a sequence of data transfer operations for transferring the data from the MS 110 to the selected input/output device through the SC 131 and the IOP 140 is terminated, the IOP 140 sends an interrupt indicative of the termination of the sequence of data transfer operations to the IP 135 or 136 through the SC 131.

Next, how data in a plurality of data blocks stored in the ES 120 corresponds to data in a plurality of data blocks stored in an external storage device or input/output device within the input/output devices 150 through the MS 110 will be explained with reference to FIGS. 1 and 4. FIG. 4 is a diagram representing a correspondence between a plurality of data blocks stored in the ES 120, the MS 110, and a specified external storage device 152 within the input/output devices 150.

Referring specifically to FIG. 4, assume that the external storage device 152 stores a plurality of data blocks, i.e., data block 1, data block 2, . . . , data block n which are to be used in information processing processes of the information processing apparatus. First, as the information processing apparatus starts information processing steps, a portion of data blocks from data block 1 to data block m within the plurality of data blocks, i.e., data block 1, data block 2, . . . , data block n stored in the external storage device 152 are transferred to the ES 120 through MS 110 in units of data block, and stored therein as data block 1, data block 2, ..., data block m, respectively. Next, in the information processing processes, the data processing advances using the plurality of data blocks 1-m stored in the ES 120. Then, while the data processing is advancing, one or a plurality of data blocks of the data blocks 1-m stored in the ES 120 are loaded into the MS 110 (page-in) or written into the ES 120 from the MS 110 (page-out) each time such operation is requested. Finally, when the information processing steps are terminated, the processed data blocks 1-m stored in the ES 120 are transferred to the external storage device 152 through the MS 110 in units of data block, and again stored therein as a portion of data block 1, data block 2, ..., data block n.

For providing an operating system with a virtual storage function so that a virtual storage device has a larger capacity than that of a real main storage, an information processing apparatus employs an external storage device as a storage medium for a virtual storage device so as to realize an access to data on the virtual storage device through page-in/page-out operations, wherein a portion of page data set (data blocks) on the external storage device is placed on a high speed accessible ES, so that the page-in/page-out operations are performed between the MS and the ES to increase the data move capability between the MS and the ES, thereby making it possible to realize significant improvements in the information processing performance of the information processing apparatus, as compared with a configuration in which page-in/page-out operations are performed between a MS and an external storage device.

Next, a time relationship of respective stages for executing program processing and page-in/page-out operations will be explained in connection with data processing which is advanced using a plurality of data blocks stored in an ES, with reference to FIGS. 1, 5 and 6.

FIG. 5 is a time chart representing a time relationship of respective stages in data processing which is advanced by the information processing apparatus using synchronous MS-ES data move instructions for executing page-in and page-out operations for a plurality of data blocks stored in the ES 120.

Time Interval 601: In the time interval 601, the IP 135 is executing a program processing operation under the control of the OS. At the time the time interval 601 expires, a page-in operation is requested for a data block. The IP 135 issues a synchronous MS-ES data move instruction to initiate a transfer operation for transferring the data block from the ES 120 to the MS 110.

Time Interval 602: In the time interval 602, the data block transfer operation, which is a page-in operation from the ES 120 to the MS 110 through the SC 131, is executed.

The data block transfer operation is controlled by the IP 135 which has issued the MS-ES data move instruction since the MS-ES data move instruction is a synchronous instruction. Thus, the IP 135 is busy as indicated by the program processing in the time interval 602 in FIG. 5.

At the time the time interval 602 expires, the data block transfer operation, i.e., the page-in operation is terminated.

Time Interval 603: In the time interval 603, a program processing operation is resumed under the control of the OS of the IP 135. When a page-out operation is requested for a data block at the time the time interval 603 expires, the IP 135 issues a synchronous MS-ES data move instruction to initiate a transfer operation for transferring the data block from the MS 110 to the ES 120.

Time Interval 604: In the time interval 604, a data block transfer operation, which is a page-out operation from the MS 110 to the ES 120 through the SC 131, is executed.

Since the MS-ES data move instruction is a synchronous instruction, the data block transfer operation is controlled by the IP 135 which has issued the instruction. Thus, the IP 135 is busy during the time interval 604.

At the time the time interval 604 expires, the data block transfer operation, which is a page-out operation, is terminated, and the IP 135 resumes the program processing operation under the control of the OS. However, as illustrated in FIG. 5, when a page-in operation for a data block is immediately requested, the IP 135 again issues a synchronous MS-ES data move instruction to initiate a transfer operation for transferring the data block from the ES 120 to the MS 110.

Time Interval 605: In the time interval 605, a data block transfer operation, which is a page-in operation from the ES 120 to the MS 110 through the SC 131, is executed.

Since the MS-ES data move instruction is a synchronous instruction, the block data transfer operation is controlled by the IP 135 which has issued the instruction. Thus, the IP 135 is busy for executing the data transfer, and cannot advance the data processing during the time interval 605.

Time Interval 606: Finally, in the time interval 606, the program processing operation is resumed under the control of the OS of the IP 135.

The operation during the time interval 606 is similar to the operation during the time interval 603. Subsequently, similar operations to the processing executed during the aforementioned time intervals are repeated.

FIG. 6 is a time chart representing a time relationship of respective stages in data processing which is advanced by the information processing apparatus using asynchronous MS-ES data move instructions for executing page-in and page-out operations for a plurality of data blocks stored in the ES 120.

Time Interval 701: In the time interval 701, the IP 135 is executing a program processing operation for a program A under the control of the OS. When a page-in operation for a data block is requested at the time the time interval 701 expires, the IP 135 issues an asynchronous MS-ES data move instruction to initiate a transfer operation for transferring the data block from the ES 120 to the MS 130.

In this event, since the MS-ES data move instruction is asynchronous, the execution of this instruction is completed as the data block transfer operation is initiated.

Subsequently, the OS serving to control the IP 135 interrupts the program processing operation for the program A to initiate a program processing operation for a program B.

Time interval 702: In the time interval 702, a data block transfer operation, corresponding to the program A which instructs a page-in operation, is executed for transferring a data block from the ES 120 to the MS 110 through the SC 131.

Simultaneously, the IP 135 is executing the program processing operation for the program B under the control of the OS. When a page-in operation for a data block corresponding to the program B is requested at the time the time interval 702 expires, the IP 135 issues an asynchronous MS-ES data move instruction to initiate a transfer operation for transferring the data block from the ES 120 to the MS 110.

In this event, since the MS-ES data move instruction corresponding to the program B is asynchronous, the instruction is completed after initiating the data block transfer operation corresponding to the program B, at the time the time interval 702 expires, subsequent to the termination of the data block transfer operation corresponding to the program A which executes the foregoing page-in operation.

Subsequently, the OS serving to control the IP 135 interrupts the program processing for the program B to initiate the program processing for the program A.

Time Interval 703: In the time interval 703, the program processing operation corresponding to the program A is resumed under the control of the OS of the IP 135. When a page-out operation for a data block corresponding to the program A is requested at the time the time interval 703 expires, the IP 135 issues an asynchronous MS-ES data move instruction to initiate a transfer operation for transferring the data block from the MS 110 to the ES 120.

In this event, since the MS-ES data move instruction is asynchronous, the instruction is completed after initiating the data block transfer operation corresponding to the program A for executing a page-out operation, at the time the time interval 703 expires, subsequent to the termination of the data block transfer operation corresponding to the program B which executes the page-in operation.

After completing the data block transfer operation corresponding to the program B for executing a page-in operation, the OS serving to control the IP 135 interrupts the program processing for the program A to initiate the program processing operation for the program B.

Time Interval 704: A data block transfer operation, which is a page-out operation corresponding to the program A, is executed in the time interval 704 for transferring a data block from the MS 110 to the ES 120 through the SC 131.

Simultaneously, the IP 135 is executing the program processing operation for the program B under the control of the OS. When the IS 135 is informed of the termination of the data block transfer operation, which is a page-out operation corresponding to the program A, at the time the time interval 704 expires, the OS serving to control the IP 135 forces the IP 135 to interrupt the program processing for the program B and to initiate the program processing operation for the program A.

The program processing operation corresponding to the program A is resumed under the control of the OS of the IP 135. When a page-in operation for a data block corresponding to the program A is requested at the time the time interval 704 expires, the IP 135 issues an asynchronous MS-ES data move instruction to initiate a transfer operation for transferring the data block from the ES 120 to the MS 110. The OS serving to control the IP 135 forces the IP 135 to interrupt the program processing for the program A and resume the program processing operation for the program B.

Time Interval 705: A data block transfer operation, corresponding to the program A which executes a page-in operation, is executed in the time interval 705 for transferring a data block from the ES 120 to the MS 110 through the SC 131.

Simultaneously, the IP 135 is executing the program processing operation for the program B under the control of the OS. When a page-out operation for a data block corresponding to the program B is requested at the time the time interval 705 expires, the IP 135 issues an asynchronous MS-ES data move instruction to initiate a transfer operation for transferring the data block from the MS 110 to the ES 120.

In this event, since the ME-ES data move instruction corresponding to the program B is asynchronous, the instruction is completed after initiating the data block transfer operation corresponding to the program B for executing a page-out operation, at the time the time interval 705 expires, subsequent to the termination of the data block transfer operation corresponding to the program A which executes the page-in operation.

Subsequently, the OS serving to control the IP 135 forces the IP 135 to interrupt the program processing for the program B and initiate the program processing operation for the program A.

Time Interval 706: In the time interval 706, the program processing operation corresponding to the program A is resumed under the control of the OS of the IP 135.

In this event, a data block transfer operation is executed for the page-out operation for the data block corresponding to the program B during the time interval 706.

The operation executed during the time interval 706 is substantially similar to that executed during the time interval 701, and operations similar to those executed during the respective time intervals are repeated subsequently.

Discussed above has been the time relationship of the respective stages in the data processing including data processing, page-in, and page-out which is advanced by the information processing apparatus.

As illustrated in the time chart of FIG. 5, when the data processing for a plurality of data blocks stored in the ES is advanced using page-in and page-out operations with synchronous MS-ES data move instructions, two page-in operations and one page-out operation for the data blocks are executed during six time intervals, and meanwhile, the IP is busy during all the six time intervals.

On the other hand, when the data processing for a plurality of data blocks stored in the ES is advanced using page-in and page-out operations with asynchronous MS-ES data move instructions as illustrated in the time chart of FIG. 6, two page-in operations and one page-out operation for the data blocks are executed for the program A during six time intervals, where the IP is busy during three time intervals and free during the remaining three time intervals. If the program B is run during the three time intervals in which the IP is free, one page-in operation and one page-out operation for data blocks are executed for the program B. Consequently, the IP is busy during all the six time intervals.

As can be understood from the foregoing, when comparing the data processing advanced using page-in and page-out operations for a plurality of data blocks with the asynchronous MS-ES data move instructions to the same data processing advanced with the synchronous ME-ES data move instructions, the former can additionally run the program B to execute one page-in operation and one page-out operation for data blocks as well as the data processing associated with the IP during the three time intervals, thus making it possible to improve the information processing throughout of the entire information processing apparatus.

As described above, in an information processing apparatus employing an ES as a storage medium for a virtual storage device, the data move capability associated with the page-in/page-out operations for moving data between the MS and the ES constitutes a critical factor for determining the information processing performance of the information processing apparatus. In this case, as illustrated in FIGS. 4 and 5, the use of the asynchronous MS-ES data move instructions in advancing the data processing for executing the page-in and page-out operations for a plurality of data blocks can improve the information processing throughput of the entire information processing apparatus, however, it does not contribute to a reduction in turn-around time from start to end of a program. A failure in reducing a turn-around time of each program means that no reduction can be expected in a turn-around time of the entire information processing apparatus from job throw-in to output of results of the information processing apparatus.

The data processing procedure executed by the information processing apparatus using a virtual storage function according to the foregoing embodiment involves the following steps. First, data is sequentially transferred from an external storage device serving as a storage medium of a virtual storage device connected to the IOP to the MS and stored in the MS, and the data stored in the MS is sequentially transferred to the ES. Thereafter, the data is processed while page-in and page-out operations are repeated between the MS and the SE, and processed data stored in the ES is subsequently transferred to the MS in sequence and stored therein. Finally, the processed data stored in the MS is sequentially outputted to the external storage device as the storage medium of the virtual storage device connected to the IOP.

The performance of the data processing procedure using the virtual storage function largely depends on the capability of data move between the MS and the ES associated with the page-in and page-out operations, so that the information processing performance of the information processing apparatus reaches an upper limit when the MS-ES data move capability is fully utilized. Thus, the MS-ES data move capability associated with the page-in and page-out operations constitutes a critical factor for determining the upper limit to the information processing performance of the information processing apparatus.

Now, another embodiment of the present invention will described in detail with reference to the drawings.

The main storage device (MS) 110 and the extended storage device (ES) 120 illustrated in FIG. 1 are allocated in a plurality of storage modules. A storage unit 100 has independent address arrays for the MS 110 and for the ES 120 which store storage module identifiers (hereinafter referred to as the "storage module number") indicating which of the storage modules, comprised in the storage unit 100, corresponds to each area in the MS 110 and the ES 120, i.e., each area (data block) divided by the upper address of the MS/ES addresses. Thus, these MS/ES address arrays are used to select a storage module for the MS 110 or for the ES 120 from a plurality of storage modules included in the storage unit 100. By rewriting the contents of the MS/ES address arrays, reconfiguration of storage modules for the MS 110 and for the ES 120 can be dynamically carried out without interrupting the execution of instructions. In this event, if the contents of the MS/ES address arrays are rewritten to change a storage module for the ES 120 to a storage module for the MS 110, a page-in operation can be realized without actually executing a data move operation. Conversely, if a storage module for the MS 110 is changed to a storage module for the ES 120, a page-out operation can be similarly realized without actually executing a data move operation. The system controller (SC) 131 has a configuration responsive to an access request to the storage unit 100 to determine whether the access request is an access request to the MS 110 or an access request to the ES 120. It should be noted that the management and control for the assignment of the plurality of storage modules comprised in the storage unit 100 to the MS 110 and/or the ES 120 is served, for example, by an operating system (OS).

FIG. 7 illustrates an exemplary configuration of a plurality of storage modules serving as storage devices for the MS 110 and the ES 120, the MS/ES address arrays, and peripheral circuits associated therewith. While the MS/ES address arrays may be located either in the storage unit 100 or in the system controller (SC) 131, the MS/ES address arrays are arranged in the storage unit 100 in this embodiment.

A main storage access request from an IP (for example, 135) in FIG. 1 is issued with a MS address corresponding to a storage area in the MS 110. Similarly, an extended storage access request from the IP is issued with an ES address corresponding to a storage area in the ES 120.

In FIG. 7, a MS address involved in a main storage access request from the IP is inputted from a signal line 8A2 through the SC 131. The signal line 8A2 is connected to a latch A810. The latch A810, which serves as an intermediate latch for temporarily storing a MS address sent thereto through the signal line 8A2, is connected to a selector A820 through a signal line 8A4 as well as to a plurality of modules including a storage module (0) 850, a storage module (1) 851, . . . , a storage module (N) 853, and so on, respectively, through a signal line 8A5.

The selector A820 receives, as an input, a portion (upper address) of the MS address which is an output of the latch A810 sent thereto through the signal line 8A4, and selects any of a plurality of MS address array entries constituting a MS address array 830 in accordance with the received input. The selector A820 is connected to the MS address array 830 through a signal line 8A6 and sends an entry selection indication signal to the MS address array 830.

The MS address array 830 is composed of a plurality of storage entries, i.e., MS address array entries assigned to respective areas in the MS 110 divided by the upper address of the MS address. The MS address array 830 selects one MS address array entry from the plurality of MS address array entries in accordance with the entry selection indication signal sent thereto through the signal line 8A6, and sends the contents of the selected entry to a latch B840 through a signal line 8A7. The MS address array 830 is also connected to a signal line 8A3 through which data is inputted thereto and written into the selected MS address array entry.

The latch B840 serves as an intermediate latch for temporarily storing the contents of the selected MS address array entry within the MS address array 830, which are sent thereto through the signal line 8A7. The latch B840 is connected to the plurality of storage modules including the storage module (0) 850, the storage module (1) 851, . . . , the storage module (N) 853, and so on as well as to the SC 131 through a signal line 8A8.

On the other hand, an ES address involved in an extended storage access request from the instruction processor (IP) 135 or 136 is inputted to an intermediate latch C811 through the system controller (SC) 131. The intermediate latch C811, which temporarily stores the ES address sent thereto through the signal line 8B2, is connected to a selector B821 through a signal line 8B4 as well as to the plurality of storage modules including the storage module (0) 850, the storage module (1) 851, . . . , the storage module (N) 853, and so on through a signal line 8B5.

The selector B821 receives, as an input, a portion (upper address) of the ES address which is an output of the latch C811 sent thereto through the signal line 8B4 and selects any of a plurality of ES address array entries constituting an ES address array 831 in accordance with the received input. The selector B821 is connected to the ES address array 831 through a signal line 8B6 and sends an entry selection indication signal to the ES address array 831.

The ES address array 831 is composed of a plurality of storage entries, i.e., ES address array entries assigned to respective areas in the ES 120 divided by the upper address of the ES address. The ES address array 831 selects one ES address array entry from the plurality of ES address array entries in accordance with the entry selection indication signal sent thereto through the signal line 8B6, and sends the contents of the selected entry to a latch D841 through a signal line 8B7. The ES address array 831 is also connected to a signal line 8B3 through which data is inputted thereto and written into the selected ES address array entry.

The latch D841 serves as an intermediate latch for temporarily storing the contents of the selected ES address array entry within the ES address array 831, which is sent thereto through the signal line 8B7. The latch D841 is connected to the plurality of storage modules including the storage module (0) 850, the storage module (1) 851, . . . , the storage module (N) 853, and so on as well as to the SC 131 through a signal line 8B8.

When an access is requested to any of the MS 110 and the ES 120, a write instruction and write data to the storage unit 100 are inputted to the plurality of storage modules including the storage module (0) 850, the storage module (1) 851, . . . , the storage module (N) 853, and so on from the SC 131 through a signal line 8A9. Data read from the storage unit 100, in turn, is sent to a signal line 8AA connected to the plurality of storage modules including the storage module (0) 850, the storage module (1) 851, . . . , the storage module (N) 853, and so on. The data read from the storage unit 100 and sent to the signal line 8AA is transferred to a data read requesting source through the SC 131 as well as to a data buffer 860 connected to the storage unit 100 through the signal line 8AA. Data transfer from the latch B840 to the storage modules and data transfer from the latch D841 to the storage modules can be carried out simultaneously.

The data buffer 860, which serves as an intermediate buffer for temporarily storing data read from the storage unit 100 (storage modules), is connected to the plurality of storage modules including the storage module (0) 850, the storage module (1) 851, . . . , the storage module (N) 853, and so on through the signal line 8A9.

As can be seen, the signal line 8A5 outputted from the latch A810 in FIG. 7 is connected to the plurality of storage modules including the storage module (0) 850, the storage module (1) 851, . . . , the storage module (N) 853, and so on. Alternatively, the signal line 8A5 may be connected to the plurality of storage modules including the storage module (0) 850, the storage module (1) 851, . . . , the storage module (N) 853, and so on through a latch B840, as illustrated in FIG. 8.

FIGS. 9A and 9B each illustrate in detail a field structure in one entry of the plurality of MS address array entries or ES address array entries constituting the MS address array 830 or the ES address array 831.

As illustrated in FIG. 7, the MS address array 830 is composed of a plurality of MS address array entries such that one MS address array entry is select from the plurality of MS address array entries in accordance with a MS address array entry selection indication signal sent thereto through the signal line 8A6. Each of the MS address array entries includes a flag field and a plurality of storage module number fields, as illustrated in FIG. 9A. Each of the plurality of storage module number fields registers the number of a storage module assigned to an area corresponding to each of the entries. The flag field indicates whether the plurality of storage module number fields are valid or invalid, and whether each of the storage module number fields belongs to the MS, the ES, or temporary, if each of the plurality of the respective storage module number fields are valid.

A storage module specified by a storage module number field, which is indicated as belonging to temporary by a flag in the flag field, is a storage module which does not belong to the MS or to the ES. The operation associated with such a storage module will be explained below with reference to FIGS. 1, 8, 9A, and 9B.

Referring first to FIG. 1, when the IP 135 or 136 issues an input/output instruction, an input/output initiation order associated with the input/output instruction is sent to the IOP 140 through the SC 131. The IOP 140, upon receiving the input/output initiation order, selects a specified input/output device from the input/output devices 150 to initiate an input operation therewith. Thereafter, the IOP 140 controls a data transfer operation for transferring data sent thereto from the specified input/output device.

The input data sent from the input/output device selected from the input/output devices 150 is once buffered in the IOP 140, and the input data buffered in the IOP 140 is then stored in the MS 110 through the SC 131.

Another embodiment of a process for storing data in the MS 110 through the SC 131 will be next explained with reference to FIG. 9A. Assume for example that (a) a value indicating that a storage module number field is valid and belongs to the MS is set to a flag in the flag field, and a value "a" is set in a corresponding storage module number field; (b) a value indicating that a corresponding storage module number field is valid and belongs to a temporary module is set to another flag in the flag field, and a value "b" is set in a corresponding storage module number field; and an invalid value, for example, is set in the remaining storage module number fields other than the foregoing two fields. Then, data to be stored in the MS 110 through the SC 131 is stored in two storage modules having the storage module number a and the storage module number b. Stated another way, the above setting results in producing storage modules holding the same data and belonging to the MS and a temporary storage module which does not belong to the MS or to the ES.

Thereafter, when a data move request is issued by the IP to move data from the MS 110 to the ES 120 as a data move instruction for moving data from the MS 110 to the ES 120, addresses are copied or moved in correspondence to the move of the data from the MS 110 to the ES 120 in accordance with a procedure illustrated in FIG. 11, later described. In addition to the procedure illustrated in FIG. 11, by adding a procedure for changing a flag in the flag field corresponding to a storage module number field belonging to temporary such that the storage module number field belongs to the MS, it is possible to maintain data to be moved in the MS 110, which is a data source, without executing an actual data move operation.

The procedure mentioned above can provide a configuration and a function which can efficiently supply requested data when data maintained in the MS 110, which is the source of the requested data, must be used.

During a sequence of instructions executed by a microprogram in the IP, assume that a plurality of data move instructions are executed successively for moving data from the same storage module location, and a subsequent instruction is prohibited from being executed due to the generation of an interrupt indicative of data move from an invalid memory location. In this event, if the data moved by the previous instructions is read and stored in a predetermined number of temporary data locations, preparation can be made to permit the execution of similar instructions subsequent to the generation of the interrupt. Similar preparation can also be made for the ES.

Referring again to FIG. 7, the ES address array 831 is also composed of a plurality of ES address array entries such that one ES address array entry is selected from the plurality of ES address array entries, constituting the ES address array 831, in accordance with an ES address array entry selection indication signal sent thereto through the signal line 8B6. As illustrated in FIG. 9B, each of the ES address array entries includes a plurality of storage module number fields, each for registering a storage module number, and a flag field for indicating whether the plurality of storage module number fields are valid or invalid, and whether each of the storage module number fields belongs to the MS, the ES, or temporary if the plurality of the respective storage module number fields are valid. A storage module number field belonging to temporary is utilized when source data must be preserved in the ES 120 when data is moved from the ES 120 to the MS 110. It should be noted that storage module number fields belonging to the MS are ignored in the ES address array entries.

When an associated ES address array entry is valid, the contents of one or a plurality of storage module number fields in the ES address array entry of the ES address array 831 are sent to the latch D841 through the signal line 8B7. Conversely, when the ES address array entry is invalid, a signal indicating the existence of a program interrupt factor due to exceptional address assignment is sent to the SC 131. Alternatively, before an ES address array entry is sent to the latch D841, determination may be made as to whether the ES address array entry is valid or invalid, such that the entry is sent to the latch D841 when valid, and the signal indicating the existence of a program interrupt factor due to exceptional address assignment is sent to the SC 131 when invalid.

The ES address array 831 is further connected to the signal line 8B3 through which data is inputted thereto and written into a selected ES address array entry. With this configuration, arbitrary data (a flag and a storage module number) can be stored in each of the ES address array entries constituting the ES address array 831, for changing the correspondence between areas of the ES 120 and the storage modules, and so on.

FIGS. 10 to 13 are flow charts for explaining operations of an embodiment of the information processing apparatus according to the present invention. In the following, exemplary operations executed by the information processing apparatus configured as illustrated in FIGS. 1 and 7 will be described in detail with reference to the flow charts of FIGS. 10 to 13.

Figure 10:
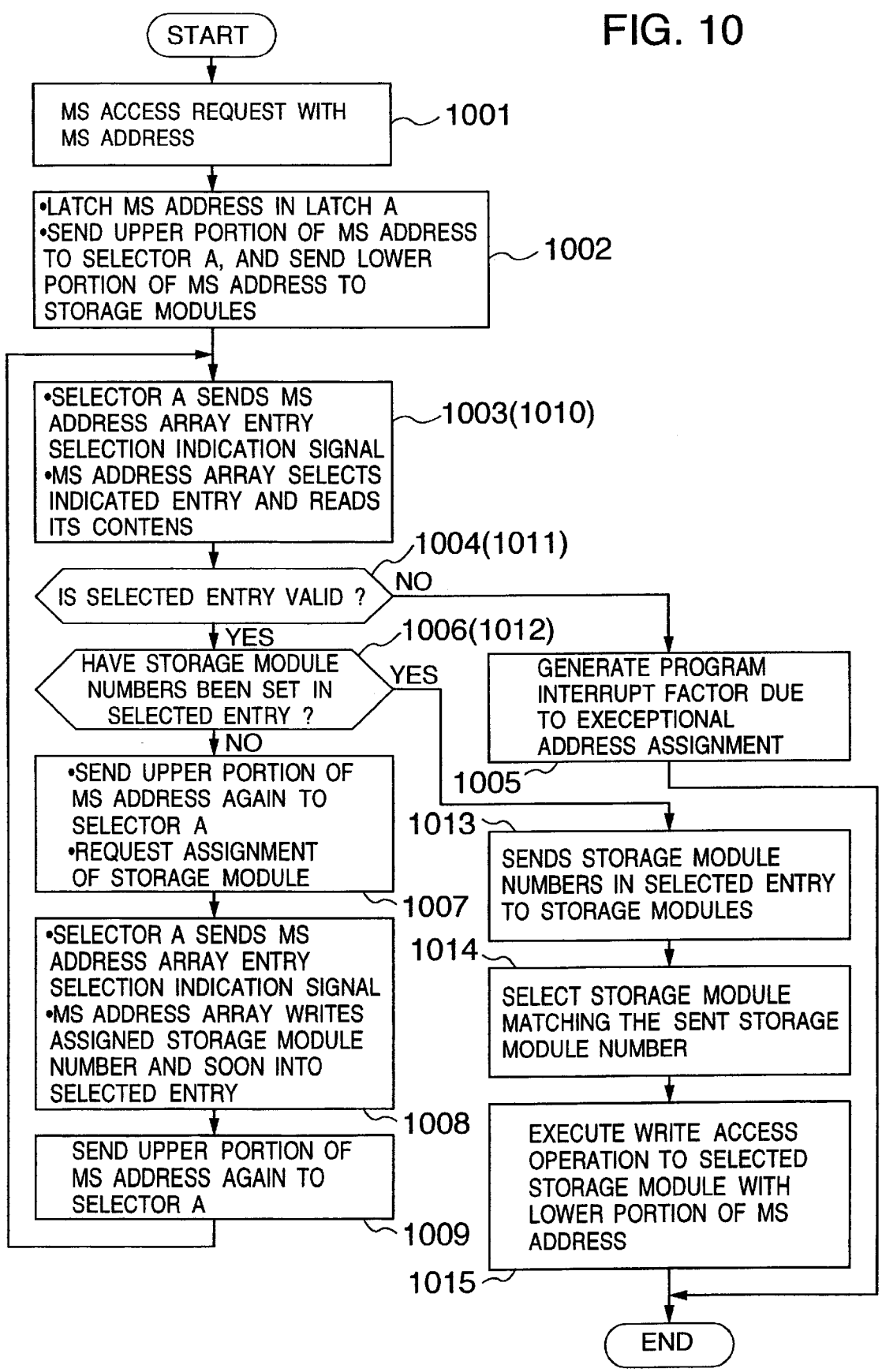
FIG. 10 is an example of a flow chart representing a data storing operation for storing data in the MS in accordance with an embodiment of the present invention.

FIG. 10 is an exemplary flow chart representing a procedure which may be executed when a data storing operation is instructed by the IOP 140 or the IP 135 or 136 through the SC 131 for storing data in the MS 110, wherein the MS address array 830 is used to select a storage module belonging to the MS within a plurality of storage modules 750–743 comprised in the storage unit 100 based on a MS address associated with a data storing operation request, and data is stored in the selected storage module. It should be noted that a basically similar procedure may be used when data is read from a storage module.

In the following, the most complicated case will be explained, where a MS address in the MS 110 associated with the data storing operation request is not assigned to any storage module, so that a flag and a storage module number should be written into an associated entry in the MS address array 830 to assign a storage module, and then the MS address array 830 is again used to select the assigned storage module in which data is stored.

Step 1001: An access to the MS 110 for storing data therein is issued with an address in the MS 110 (hereinafter referred to as the "MS address") from the IOP 140 or the IP 135, 136 through the SC 131. The MS address is inputted to the latch A810 through the signal line 8A2. The data to be stored in turn is applied to the signal line 8A9.

Step 1002: The MS address sent through the signal line 8A2 is latched in the latch A810.

The latch A810 serves as an intermediate latch for temporarily storing the MS address sent thereto through the signal line 8A2. An upper portion of the MS address value latched in the latch A810 is sent to the selector A820 through the signal line 8A4.

Simultaneously, a lower portion of the MS address value latched in the latch A810 is sent to the plurality of storage modules including the storage module (0) 850, the storage module (1) 851, . . . , the storage module (N) 853, and so on through the signal line 8A5

Step 1003: The selector A820 uses the upper portion of the MS address value sent thereto through the signal line 8A4 to issue an instruction to select one MS address array entry from a plurality of MS address array entries in the MS address array 830, and sends the instruction to the MS address array 830 through the signal line 8A6.

The MS address array 830 selects the one MS address array entry from the plurality of MS address array entries in the MS address array 830, and sends the contents of the selected entry to the latch B840 through the signal line 8A7.

Step 1004: The latch B840 tests whether the flag field in the MS address array entry sent thereto through the signal line 8A7 is valid or invalid.

If the flag field in the MS address array entry is valid, the procedure goes to step 1006. Conversely, if the flag field in the MS address array entry is invalid, the procedure goes to step 1005.

Step 1005: This step is executed when the flag field in the MS address array entry selected at step 1003 is invalid. Here, a program interrupt factor due to exceptional address assignment is generated, and the current operation for accessing the MS 110 is interrupted.

In other words, an invalid flag field in a MS address array entry indicates that a storage module corresponding to the storage area in the MS 110 specified by the MS address array entry is not usable due to a failure or the like or the storage module does not exist.

Step 1006: This step is executed when the flag field in the MS address array entry selected at step 1003 is valid.

The latch B840 latches the contents of the MS address array entry sent thereto through the signal line 8A7, i.e., the flag field and the plurality of storage module number fields.

Subsequently, the flag field and the plurality of storage module number fields latched in the latch B840 are tested whether or not they have been set. The procedure goes to step 1013 if they have been set, and to step 1007 if they have not been set. In this embodiment, it is assumed that they have not been set (not assigned).

Step 1007: The latch A810, which latches the MS address sent thereto through the signal line 8A2 at step 1002, again sends the upper portion of the latched MS address to the selector A820 through the signal line 8A4.

Simultaneously, the assignment of a storage module to an area corresponding to the upper portion of the MS address is requested to the OS. When the storage module is newly assigned by the OS, write data including a storage module number corresponding to the assigned storage module is sent to the signal line 8A3 through the SC 131.

Step 1008: The selector A820 uses the upper portion of the MS address value sent thereto through the signal line 8A4 to again issue an instruction to select one MS address array entry from the plurality of MS address array entries in the MS address array 830, and sends the instruction to the MS address array 830 through the signal line 8A6.

The MS address array 830 selects the MS address array entry from the plurality of MS address array entries in the MS address array 830, and writes write data sent thereto through the signal line 8A3 into the selected MS address array entry.

The write data at this time is data to be set in a MS address array entry, i.e., data comprising a flag field and one or a plurality of storage module number fields, associated with the assignment of a new storage module to the MS area corresponding to the upper portion of the MS address latched in the latch A810 at step 1002. The flag field includes a flag indicative of validity and a MS flag, while the storage module number field includes the number of the newly assigned storage module. In addition, the write data may also include a temporary flag and the number of a storage module belonging to temporary.

Step 1009: The latch A810, which latches the MS address sent thereto through the signal line 8A2 at step 1002, again sends the upper portion of the MS address value to the selector A820 through the signal line 8A4.

Simultaneously, the latch A810 sends the lower portion of the MS address value latched therein to the plurality of storage modules including the storage module (0) 850, the storage module (1) 851, ... , the storage module (N) 853, and so on through the signal line 8A5.

Step 1010: This step 1010 is the same as step 1003, where the selector A820 uses the upper portion of the MS address value sent thereto through the signal line 8A4 to issue an instruction to select one MS address array entry from the plurality of MS address array entries in the MS address array 830, and sends the instruction to the MS address array 830 through the signal line 8A6.

The MS address array 830 selects the MS address array entry from the plurality of MS address array entries in the MS address array 830, and sends the contents of the selected entry to the latch B840 through the signal line 8A7. Here, the contents of the entry is the data written thereinto at step 1008.

Step 1011: This step is the same as step 1004, where the latch B840 tests whether the flag field in the MS address array entry sent thereto through the signal line 8A7 is valid or invalid. The procedure goes to step 1012 if the flag field in the MS address array entry is valid, and to step 1005 if invalid.

At this step, since the flag field in the MS address array entry has been set to be valid at step 1008, the procedure goes to step 1012.

Step 1012: This step the same as step 1006, and is executed when the flag field in the MS address array entry selected at step 1010 is valid.

Specifically, the latch B840 latches the contents of the MS address array entry sent thereto through the signal line 8A7, i.e., the flag field and the storage module number fields.

Subsequently, the latched flag field and storage module number fields are tested whether or not they have been set. The procedure goes to step 1013 if they have been set, and to step 1007 if they are not set.

At this step, since the flag field and the storage module number fields have been set in the MS address array entry at step 1008, the procedure goes to step 1013.

Step 1013: The storage module number latched in the latch B840 at step 1012 is sent to the plurality of storage modules including the storage module (0) 850, the storage module (1) 851, ... , the storage module (N) 853, and so on through the signal line 8A8.

Step 1014: The storage module number sent through the signal line 8A8 is received by the storage module (0) 850, the storage module (1) 851, ... , the storage module (N) 853, and so on, and an access is permitted to a storage module assigned the same number as the sent storage module number, and the storage module is then set into an accessible state.

Step 1015: The storage module, to which an access has been permitted at step 1014, fetches the lower portion of the MS address value, which is an output of the latch A810 sent therefrom through the signal line 8A5 at step 1009, as the storage device address for accessing the storage module, and the access to the storage module is executed. Specifically, since the access in this event is a write operation request to the MS 110, the data sent through the signal line 8A9 is written into the access permitted storage module.

If a storage module number field belonging to the MS and a storage module number field belonging to temporary are set in a MS address array entry, an access is permitted to two corresponding storage modules, so that the same data is simultaneously written into the respective storage modules.

Thus, described above has been the procedure executed when, upon requesting addresses for storing data in the MS, a MS storage area required for the access has not been assigned to any storage module. When a storage area in the MS required for the access has been assigned to a storage module and the validation flag, the storage module number, and so on have also been set in an associated entry in the MS address array 830, the processing at steps 1007–1010 is not required, so that the procedure immediately goes to step 1013 after the processing at steps 1001–1006 has been completed. In addition, if a plurality of storage module number fields are used in a MS address array entry, different storage modules can be simultaneously accessed with the same data.

Figure 11:
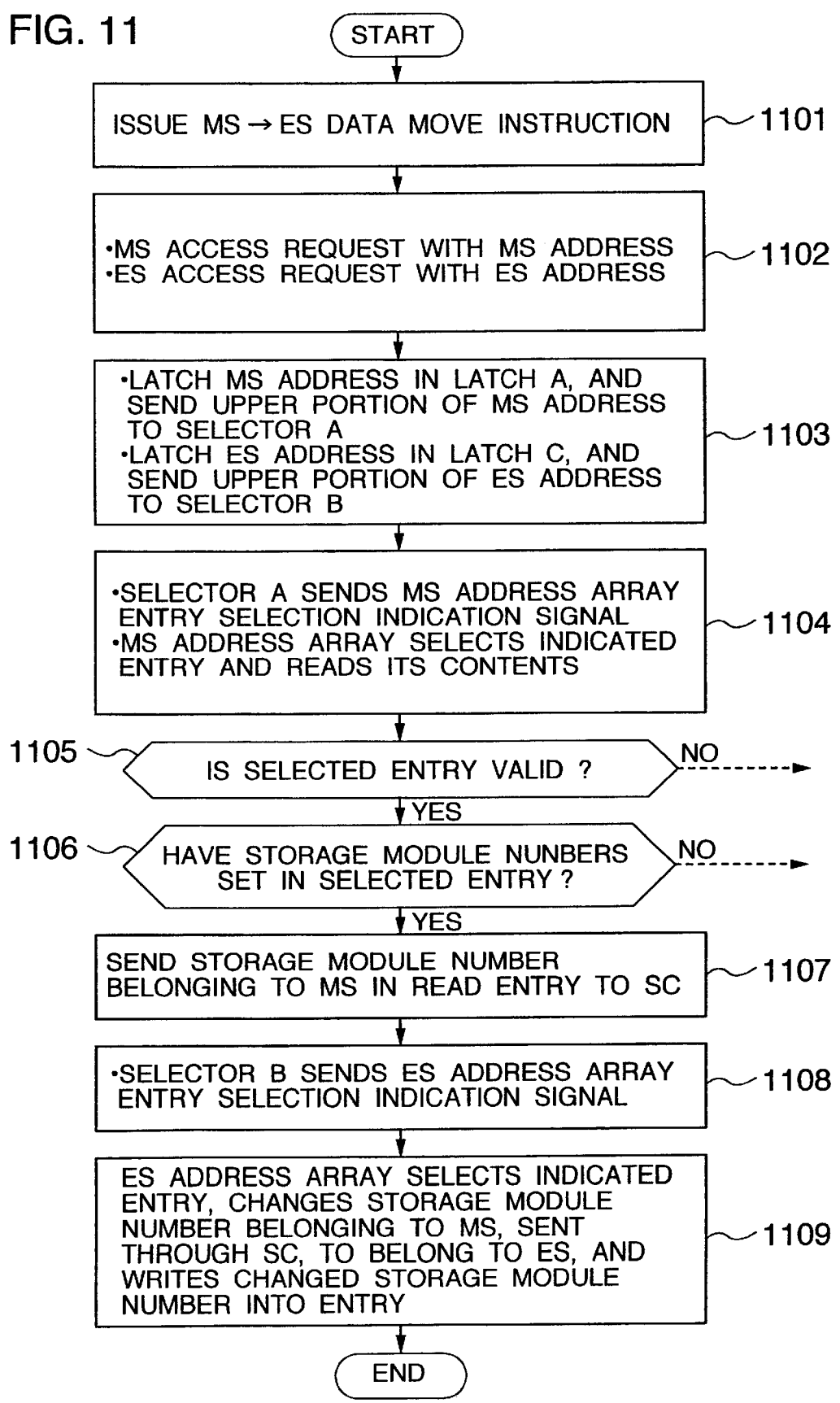
FIG. 11 is an example of a flow chart representing a data move operation for moving data from the MS to the ES in accordance with an embodiment of the present invention.

FIG. 11 is a flow chart representing a procedure for changing the attribute from MS to ES for an associated storage module in the plurality of storage modules 850–853 included in the storage unit 100 by using the MS address array 830 and the ES address array 831. This procedure is executed together with a data move instruction when it is issued for moving data from the MS 110 to the ES 120 (page-out).

Step 1101: A data move instruction for moving data from the MS 110 to the ES 120 is issued from the IP (assume IP 135), and a request for data move from the MS 110 to the ES 120 is initiated.

Step 1102: A MS address and an ES address, which are operands of the data move instruction issued by the IP 135 for moving data from the MS 110 to the ES 120, are inputted to the latch A810 and the latch C811 through the signal line 8A2 and the signal line 8B2, respectively.

At this step, a storage area required by an access to the MS 110 has already been assigned to the storage modules

850–853. Specifically, in the respective MS address array entries constituting the MS address array 830 corresponding to the MS address, the number of a storage module required for the access to the MS 110 has been set in one or a plurality of storage module number fields corresponding to the storage area in the MS 110.

Step 1103: The MS address sent through the signal line 8A2 is latched in the latch A810, while the ES address sent through the signal line 8B2 is latched in the latch C811.

The latch A810, which is an intermediate latch for temporarily storing the MS address sent thereto through the signal line 8A2, sends an upper portion of the MS address value latched therein to the selector A820 through the signal line 8A4. The latch C811, which in turn is an intermediate latch for temporarily storing the ES address sent thereto through the signal line 8B2, sends an upper portion of the ES address value latched therein to the selector B821 through the signal line 8B4.

Step 1104: The selector A820 uses the upper portion of the MS address value sent thereto through the signal line 8A4 to issue an instruction to select one MS address array entry from the plurality of MS address array entries in the MS address array 830, and sends the instruction to the MS address array 830 through the signal line 8A6.

The MS address array 830 selects the MS address array entry from the plurality of MS address array entries in the MS address array 830, and sends the contents of the selected entry to the latch B840 through the signal line 8A7.

Step 1105: The latch B840 tests whether the flag field in the MS address array entry sent thereto through the signal line 8A7 is valid or invalid.

Here, assume that the flag field in the MS address array entry is valid. Thus, in this case, the procedure goes to step 1106. Conversely, if the flag field in the MS address array entry is invalid, a program interrupt factor due to exceptional address assignment is generated in a manner similar to step 1005 in FIG. 10.

Step 1106: This step is executed when the flag field in the MS address array entry selected at step 1104 is valid. The latch B840 latches the contents of the MS address array entry sent thereto through the signal line 8A7, i.e., the flag field and the storage module number fields.

Subsequently, the latched flag field and storage module number fields are tested whether or not they have been set. In this embodiment, it is assumed that they have been set. Thus, the procedure goes to step 1107.

Step 1107: The contents of the storage module number field corresponding to the flag field having a flag set to the MS, latched in the latch B840 at step 1106, are sent to the SC 131 through the signal line 8A8. Specifically, the contents of the storage module number field indicate the number of a storage module which is subjected to a page-out operation, and are sent to the signal line 8B3 through the SC 131 as a portion of write data (address data) to the ES address array 831.

Step 1108: The latch C811 sends the upper portion of the ES address value sent thereto through the signal line 8B2 and latched therein to the selector B821 through the signal line 8B4.

The selector B821 uses the upper portion of the ES address value sent thereto through the signal line 8B4 to issue an instruction to select one ES address array entry from a plurality of ES address array entries in the ES address array 831, and sends the instruction to the ES address array 831 through the signal line 8B6.

Step 1109: The ES address array 831 selects the ES address array entry from the plurality of ES address array entries in the ES address array 831, and writes write data (address data) sent through the signal line 8B3 into the selected ES address array entry.

The write data in this event (address data) includes a flag value in the flag field changed from MS to ES and the value in the storage module number field corresponding to the changed flag, contained in the MS address array entry sent to the SC 131 through the signal line 8A8 at step 1107. These values are newly assigned to the ES 120.

The foregoing procedure enables a storage module so far belonging to the MS to be reconfigured as a storage module belonging to the ES, which subsequently functions as part of the ES 120, without executing any actual data move operation. The valid bit in the flag field of this MS address array entry is reset to invalidate data contained in the MS 110. Thus, the storage module, which has stored the data, can be utilized as another new area.

If a storage module number field belonging to the MS and a storage module number field belonging to temporary (later described) are set in an associated entry in the MS address array 830 and the same data is stored in respective storage modules corresponding to these fields, the contents of the storage module number field belonging to temporary is sent to the SC 131 at step 1107. Thus, the data can be preserved in the MS 110 when the data is moved from the MS 110 to the ES 120.

Figure 12:
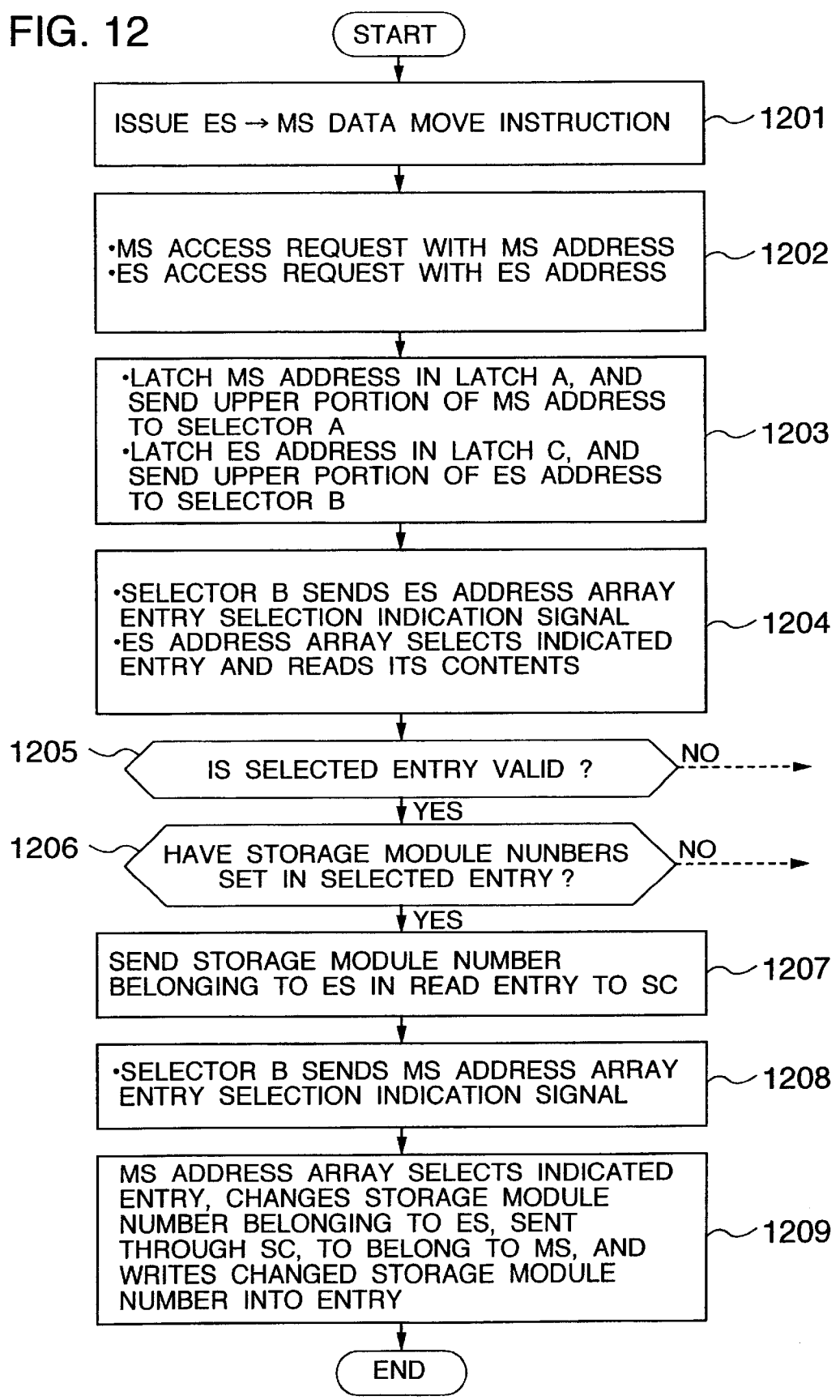
FIG. 12 is an example of a flow chart representing a data move operation for moving data from the ES to the MS in accordance with an embodiment of the present invention.

FIG. 12 is a flow chart representing a procedure for changing the attribute from ES to MS for an associated storage module in the plurality of storage modules 850–853 included in the storage unit 100 by using the MS address array 830 and the ES address array 831. This procedure is executed together with a data move instruction when it is issued for moving data from the ES 120 to the MS 110 (page-in), conversely to the case of FIG. 11.

Step 1201: A data move instruction for moving data from the ES 120 to the MS 110 is issued from the IP (assume IP 135), and a request for data move from the ES 120 to the MS 110 is initiated in response.

Step 1202: An ES address and a MS address, which are operands of the data move instruction issued by the IP 135 for moving data from the ES 120 to the MS 110, are inputted to the latch C811 and the latch A810 through the signal line 8B2 and the signal line 8A2, respectively.

At this step, a storage area required by an access to the ES 120 has already been assigned to the storage modules 850–853. Specifically, in the respective ES address array entries constituting the ES address array 831 corresponding to the ES address, the number of a storage module required for the access to the ES 120 has been set in one or a plurality of storage module number fields corresponding to the storage area in the ES 120.

Step 1203: The MS address sent through the signal line 8A2 is latched in the latch A810, while the ES address sent through the signal line 8B2 is latched in the latch C811.

The latch A810, which is an intermediate latch for temporarily storing the MS address sent thereto through the signal line 8A2, sends an upper portion of the MS address value latched therein to the selector A820 through the signal line 8A4. The latch C811, which in turn is an intermediate latch for temporarily storing the ES address sent thereto through the signal line 8B2, sends an upper portion of the ES address value latched therein to the selector B821 through the signal line 8B4.

Step 1204: The selector B821 uses the upper portion of the ES address value sent thereto through the signal line 8B4 to issue an instruction to select one ES address array entry from the plurality of ES address array entries in the ES address array 831, and sends the instruction to the ES address array 831 through the signal line 8B6.

The ES address array 831 selects the ES address array entry from the plurality of ES address array entry in the ES address array 831, and sends the contents of the selected entry to the latch D841 through the signal line 8B8.

Step 1205: The latch D841 tests whether the flag field in the ES address array entry sent thereto through the signal line 8B8 is valid or invalid.

Here, assume that the flag field in the ES address array entry is valid. Thus, in this case, the procedure goes to step 1206. Conversely, if the flag field in the ES address array entry is invalid, a program interrupt factor due to exceptional address assignment is generated in a manner similar to step 1005 in FIG. 10.

Step 1206: This step is executed when the flag field in the ES address array entry selected at step 1204 is valid. The latch D841 latches the contents of the ES address array entry sent thereto through the signal line 8B8, i.e., the flag field and the storage module number field.

Subsequently, the latched flag field and storage module number fields are tested whether or not they have been set. In this embodiment, it is assumed that they have been set. Thus, the procedure goes to step 1207.

Step 1207: The contents of the storage module number field corresponding to the flag field having a flag set to the ES, latched in the latch D841 at step 1206, are sent to the SC 131 through the signal line 8B8. Specifically, the contents of the storage module number field indicate the number of a storage module which is subjected to a page-in operation, and are sent to the signal line 8A3 through the SC 131 as a portion of write data (address data) to the MS address array 830.

Step 1208: The latch A810 sends the upper portion of the MS address value sent thereto through the signal line 8A2 and latched therein to the selector A820 through the signal line 8A4.

The selector A820 uses the upper portion of the MS address value sent thereto through the signal line 8A4 to issue an instruction to select one MS address array entry from a plurality of MS address array entries in the MS address array 830, and sends the instruction to the MS address array 830 through the signal line 8A6.

Step 1209: The MS address array 830 selects the MS address array entry from the plurality of MS address array entries in the MS address array 830, and writes write data (address data) sent through the signal line 8A3 into the selected MS address array entry.

The write data in this event (address data) includes a flag value in the flag field changed from ES to MS and the value in the storage module number field corresponding to the changed flag, contained in the ES address array entry sent to the SC 131 through the signal line 8B8 at step 1207. These values are newly assigned to the MS 120.

The foregoing procedure enables a storage module so far belonging to the ES to be reconfigured as a storage module belonging to the MS, which subsequently functions as part of the MS 110, without executing any actual data move operation. The valid bit in the flag field of this ES address array entry is reset may be reset to invalidate data contained in the ES 120. Thus, the storage module, which has stored the data, can be utilized as another new area.

Figure 13:
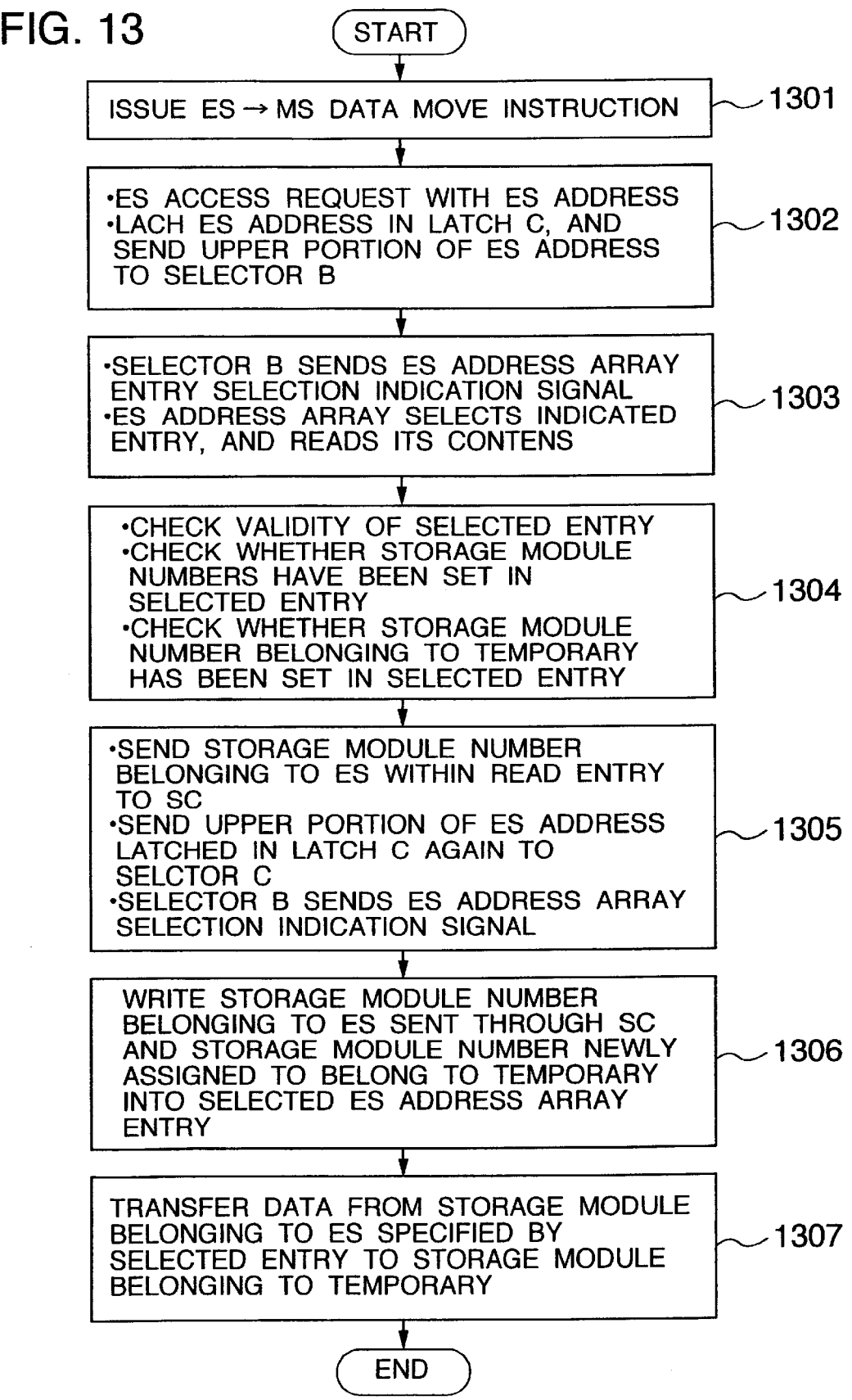
FIG. 13 is an example of a flow chart representing an operation executed when data is moved from the ES to the MS for preserving source data in the ES in accordance with an embodiment of the present invention.

FIG. 13 is a flow chart representing a sequence of operations for preserving source data in the ES 120, which is executed when data is moved a plurality of times from an area in the ES 120 to the MS 110 without changing the contents of the ES 120, i.e., when the contents of the ES 120 are treated exclusively for read-out, wherein the attribute is changed from MS to ES for an associated storage module in an associated the plurality of storage modules 850–853 comprised in the storage unit 100 by using the MS address array 830 and the ES address array 831.

Step 1301: When a data move instruction for moving data from the ES 120 to the MS 110 is issued from the IP (assume IP 135), and a request for data move from the ES 120 to the MS 110 is initiated in response.

Step 1302: An ES address, which is an operand of the data move instruction issued by the IP 135 for moving data from the ES 120 to the MS 110, is inputted to the latch C811 through the signal line 8B2, and latched therein.

The latch C811, which is an intermediate latch for temporarily storing the ES address sent thereto through the signal line 8B2, sends an upper portion of the ES address value latched therein to the selector B821 through the signal line 8B4.

Simultaneously, a lower portion of the ES address latched in the latch C811 is sent to the plurality of storage modules including the storage module (0) 850, the storage module (1) 851, . . . , the storage module (N) 853 through the signal line 8B5.

Step 1303: The selector B821 uses the upper portion of the ES address value sent thereto through the signal line 8B4 to issue an instruction to select one ES address array entry from a plurality of ES address array entries in the ES address array 831, and sends the instruction to the ES address array 831 through the signal line 8B6.

The ES address array 831 selects the ES address array entry from the plurality of ES address array entries in the ES address array 831, and sends the contents of the selected entry to the latch D841 through the signal line 8B8.

Step 1304: The latch D841 tests whether the flag field in the ES address array entry sent thereto through the signal line 8B8 is valid or invalid. Here, assume that the flag field in the ES address array entry is valid.

The latch D841 latches the contents of the ES address array entry sent thereto through the signal line 8B8, i.e., the flag field and the storage module number fields.

Subsequently, the latched flag field and plurality of storage module number fields are tested whether or not they have been set. In this embodiment, it is assumed that they have been set. The latch D841 tests whether or not a storage module number field having a temporary flag exists in the flag field and the plurality of storage module number field latched therein. The procedure goes to step 1305 if no storage module having a temporary flag exists, and the procedure for preserving the source data in the ES 120 is terminated since the data is determined to have already been preserved.

Step 1305: The latch D841 sends the contents of the storage module number field corresponding to the flag field having a flag set to the ES, within the storage module number fields latched in the latch D841 at step 1206, to the SC 131 through the signal line 8B8. Simultaneously, a request for assigning a temporary storage module is issued. An internal control program previously stored in a hardware area in the MS 110 or in the IP 135 or 136 in FIG. 1 memorizes which storage module can be used as a temporary storage area, and controls the assignment of a temporary area in response to the assignment request.

The latch C811 sends the upper portion of the ES address value (sent thereto through the signal line 8B2) latched therein at step 1302 to the selector B821 through the signal line 8B4.

The selector B821 uses the upper portion of he ES address to issue an instruction to select one ES address array entry from the plurality of ES address entries in the ES address array 831, and sends the instruction to the ES address array 831 through the signal line 8B6.

Step 1306: The ES address array 831 selects the ES address array entry from the plurality of ES address array entries in the ES address array 831, and writes write data sent through the signal line 8B3 into the selected ES address array entry.

The write data in this event includes a combination of the contents of the storage module number field to be newly assigned to temporary and the contents of the ES address array entry sent to the SC 131 through the signal line 8B8 at step 1305.

As a result of executing this step, the contents of a storage module field belonging to temporary are added to the ES address array entry in addition to the previously existing storage module field belonging to the ES. The number of added storage module fields can be increased by increasing the number of storage module numbers illustrated in FIG. 9B.

Step 1308: The ES address array 831 sends the contents of the new ES address array entry written at step 1306, i.e., the storage module field belonging to the ES and the contents of the storage module filed belonging to temporary, to the latch D841 through the signal line 8B8.

The latch D841 latches the contents of the new ES address array entry, and sends the same to the plurality of storage modules including the storage module (0) 850, the storage module (1) 851, . . . , the storage module (N) 853, and so on through the signal line 8B8.

In accordance with the contents of the ES address array entry sent through the signal line 8B5, data is sequentially read from a storage module specified by the storage module field belonging to the ES, within the storage module (0) 850, the storage module (1) 851, . . . , the storage module (N) 853, and the read data is sent to the data buffer 860 through the signal line 8AA.

The data buffer 860 once buffers the data sent thereto through the signal line 8AA, and sequentially writes, through the signal line 8A9, the data into the storage module specified by the storage module field belonging to temporary within the storage module (0) 850, the storage module (1) 851, . . . , the storage module (N) 853.

Briefly, the data is transferred from the storage module indicated by the storage module field belonging to the ES specified by the contents of the new ES address array entry latched in the latch D841 to the storage module indicted by the storage module number field belonging to temporary specified by the contents of the ES address array entry.

The foregoing procedure enables source data to be preserved when the data is moved from the ES 120 to the MS 110. This procedure for preserving source data in the ES 120 may be executed in synchronism with a data move operation for moving data from the ES 120 to the MS 110, or may be executed independently of the execution of a data move instruction for moving data between the MS 110 and the ES 120.

While exemplary operations executed by the information processing apparatus of the present invention have been described in connection with the hardware logic of FIG. 7, it goes without saying that the processing illustrated in FIGS. 10–13 and so on may be executed under the control of a so-called microprogram.

What is claimed is:

1. An information processing apparatus comprising:
    a storage device having a plurality of storage areas which can be assigned to first and second storages;
    a first table connected to said storage device and having address entries indicating storage areas assigned to said first storage among said plurality of address entries; and
    a second table connected to said storage device and having address entries indicating storage areas assigned to said second storage among said plurality of address entries,
    wherein a storage module number of said first table is moved to a second address entry of said second table when a transfer instruction of a data transfer from said first storage to said second storage is executed.

2. An information processing apparatus according to claim 1, wherein a storage module number of said second table is moved to a first address entry of said first table, when a transfer instruction of a data transfer from said second storage to said first storage is executed.

* * * * *